United States Patent
Ponzio et al.

(10) Patent No.: US 6,564,444 B1
(45) Date of Patent: May 20, 2003

(54) MACHINE AND METHOD FOR INSERTING INSULATING PAPER IN THE SLOTS OF ARMATURES OF ELECTRIC MOTORS

(75) Inventors: Massimo Ponzio, Barberino V. Elsa (IT); Fabrizio Cresti, Tavarnelle V. Pesa (IT)

(73) Assignee: ATOP S.p.A., Barberino V. Elsa (IT)

( * ) Notice: Subject to any disclaimer, the term of this patent is extended or adjusted under 35 U.S.C. 154(b) by 272 days.

(21) Appl. No.: 09/593,780

(22) Filed: Jun. 14, 2000

(30) Foreign Application Priority Data

Jun. 15, 1999 (IT) .......................... PI99A0033

(51) Int. Cl.$^7$ ............................................. H02K 15/04
(52) U.S. Cl. ............................ 29/598; 29/596; 29/605; 29/709; 29/407.1
(58) Field of Search ......................... 29/596, 297, 298, 29/732, 605, 606, 407.1, 709, 711, 712, 714, 715; 310/215

(56) References Cited

U.S. PATENT DOCUMENTS

| | | | | |
|---|---|---|---|---|
| 3,703,854 A | * | 11/1972 | Schlaudroff | .................. 493/344 |
| 3,778,890 A | * | 12/1973 | Schlaudroff | .................... 29/596 |
| 4,349,956 A | * | 9/1982 | Koenig | ......................... 29/596 |
| 4,507,580 A | * | 3/1985 | Obara | ........................... 29/596 |
| 6,065,204 A | * | 5/2000 | DeHart | ......................... 29/596 |
| 6,282,773 B1 | * | 9/2001 | Luttrell | ...................... 29/564.6 |
| 6,353,986 B1 | * | 3/2002 | Becherucci et al. | ........ 29/401.1 |

FOREIGN PATENT DOCUMENTS

EP 0289759 3/1988

* cited by examiner

*Primary Examiner*—Gregory Vidovich
*Assistant Examiner*—Stephen Kenny
(74) *Attorney, Agent, or Firm*—Simpson & Simpson, PLLC

(57) ABSTRACT

An apparatus for automatically inserting insulating material into the slots of armatures of electric motors generally includes means for feeding a continuous web of insulating material beyond a cutting device, cutting the insulative material at a predetermined length, bending the insulative material to comport with the shape of an armature slot, inserting the insulative material into the slot, and indexing the armature for further insertion of insulative materials. The apparatus further comprises electronically programmable device for automatically determining and communicating the length of the insulative material to be cut based on the dimensions of the armature, automatically feeding, cutting, bending, and inserting the insulative material into the armature slot, and automatically indexing the armature for the insertion of additional insulative materials.

9 Claims, 6 Drawing Sheets

US 6,564,444 B1

MACHINE AND METHOD FOR INSERTING INSULATING PAPER IN THE SLOTS OF ARMATURES OF ELECTRIC MOTORS

This application claims the benefit of the filing date under 35 U.S.C. 119(a) of Italian Patent Application No. IT PI99A000033 filed on Jun. 15, 1999.

FIELD OF THE INVENTION

The present invention relates to a machine for inserting insulating paper in the slots of armatures of electric motors.

Furthermore the invention relates to a method for operating the cutting and inserting devices for the insulating paper as well as for the correct location of the armatures in an insulating or wedge inserting machine.

BACKGROUND OF THE INVENTION

The insulating or wedge inserting machines for armatures have the function of inserting in the longitudinal slots of the armatures of electric motors portions of insulating cut paper by a continuous web.

The common main movements of insulating machines are:
  feeding the continuous paper beyond a cutting zone,
  cutting the paper, normally by means of a cutter,
  bending the cut portion,
  inserting the cut and bent portion in the slot of the armature, and
  indexing or angular positioning the armature.

In wedge inserting machines there is the only difference that the step of bending is missing, since the paper is inserted in the slots of the armature in plane longitudinally embossed conditions.

In known machines of this type all said movements are carried out by a single mechanism with a single drive, comprising cams and gears. This way, it is possible a synchronisation of all the movements and the achievement of high production rates.

Armature production lines, however, are required to work with even much more flexibility and require, furthermore, higher quality of the final product.

The drawback of known machines, however, is that they have not high flexibility in case of change of the dimensions of the armature, since they require always, even if short, a stop time of the production to adjust the strokes of the many parts that carry out the above described movements, according to the dimensions of the armature, among which the stack height, the diameter, the length, etc.

In EP289759 an insulating machine is described for armatures of electric motors having means for measuring the height of the stack of sheets of the armature and a system to stop the insulating paper in order to adjust the length of the cut paper. However, this machine, even if it has a flexibility higher than the previous traditional machines, it does not provide a control of speed, whereby single operations can be repeated only at the same speed of the paper in order to achieve the synchronisation. A variation of speed requires a new adjustment of the machine.

Furthermore the system of inserting paper at variable length of EP289759 is subject to errors owing to variations of coefficient of friction of the paper, since the adjustment of the length is obtained by means of a sliding of the feeding roller on the paper same. As a consequence of this fact the paper shrivels, preventing from, in particular, using different types of insulating paper according to the types of armatures, without setting again the machine.

SUMMARY OF THE INVENTION

It is therefore object of the present invention to provide a machine for inserting insulating paper in the slots of armatures of electric motors wherein a high flexibility is possible of choice of the inserting parameters.

It is another object of the present invention to provide a method for operating the devices for feeding, cutting, inserting the insulating paper and for indexing the armatures in an insulating or wedge inserting machine, wherein the automatic change and adaptation of the strokes of such devices according to the dimensions of the armature and the production rate is met.

These and other objects are achieved by the armature insulating machine, of the type that has a plurality of longitudinal slots to line of insulating paper, comprising:
  means for feeding a web of insulating continuous paper in a feeding direction;
  means for transversally cutting the web into portions of predetermined length;
  means for inserting the cut and bent portions into the slots, and
  means for indexing the armatures.
Its characteristic is that it further comprises:
  means for feeding the web beyond the means for cutting,
  means for operating in turn the means for cutting, inserting and indexing,
  sensors means suitable for giving a signal proportional to the achievement by the paper of a predetermined position beyond the means for cutting;
  electronically programmable means for controlling the means for feeding and the means for operating responsive to said signal so that in turn portions of paper of predetermined length are cut.
Said means for inserting in the insulating machines, differently from the wedge inserting machines, also provides preliminary bending means of the paper according to the shape of the slot in which it has to be inserted.

The electronically programmable means can provide means for synchronising the means for feeding with the means for operating, comprising first encoding means of the means for feeding, second encoding means of the means for operating, a control unit suitable for driving the means for feeding and the means for operating according to a predetermined function responsive to signals coming from the first and second encoding means.

Preferably the means for feeding the web provide a first motor and the means for operating in synchronism the means for cutting, inserting and indexing, provide a second motor along with distribution means for timing in turn the respective movements.

Advantageously, means are provided for carrying out a measurement of the dimensions of the armatures, such as in particular the stack height, the electronically programmable means controlling the means for feeding responsive to this measurement so that portions of paper are cut in turn of corresponding length.

The second means for operating in synchronism the means for cutting, inserting and indexing, can comprise:
  means for operating in turn the means for cutting and inserting;
  means for operating the means for indexing,
  angle sensor means suitable for giving a third signal proportional to the achievement by the armature of a predetermined angular position with respect to the means for inserting;

electronically programmable means for controlling the means for indexing according to the third signal so that a predetermined angular movement of index is given.

In this case, the first means for feeding the web can provide a first motor, whereas the second means for operating in synchronism the means for cutting, bending, inserting can provide a second motor and distribution means for timing in turn the respective movements and the third means for operating the means for indexing can provide a third motor.

The second electronically programmable means can comprise means for synchronising the means for indexing with the means for operating, the control unit driving the means for indexing and the means for operating according to a predetermined function responsive to signals coming from the second encoding means and from the signal of angular position.

Concerning another aspect of the invention, a method for operating the devices for feeding, cutting and inserting the insulating paper as well as for the correct angular positioning of the armatures in an insulating or wedge inserting machine for armatures having a plurality of longitudinal slots comprises the steps of:

feeding a web of insulating continuous paper in a feeding direction;

Transversally cutting the web into portions of predetermined length;

Bending the cut portions according to a bend similar to the cross section of the slots, inserting the cut and bent portions into the slots, and indexing the armatures for offering in turn the slots of the armatures among an inserting and the following.

The characteristic of the method is that the following steps are provided:

feeding the web beyond the means for cutting and detection of a first signal proportional to the achievement by the paper of a predetermined position before the cutting;

operating separately and in turn the means for cutting, inserting and indexing, and detection of a second signal on the progress of the operating step, controlling the feeding and the operating step according to the first and second signal so that portions of paper of predetermined length are cut and inserted in turn.

In this case, the cutting, inserting and indexing steps comprise:

operating in turn the cutting and inserting steps;

operating independently the indexing step, detecting a signal of angular position of the armature during the step of indexing, controlling the indexing step responsive to said signal of angular position and stopping of indexing when a predetermined angular position is reached.

BRIEF DESCRIPTION OF THE DRAWINGS

Further characteristics and advantages of the insulating machine and of the relative operating method of its devices according to the present invention will be made clearer with the following description of an embodiment thereof, exemplifying but not limitative, with reference to the attached drawings, wherein.

DESCRIPTION OF A PREFERRED EMBODIMENTS

Figure 1A:
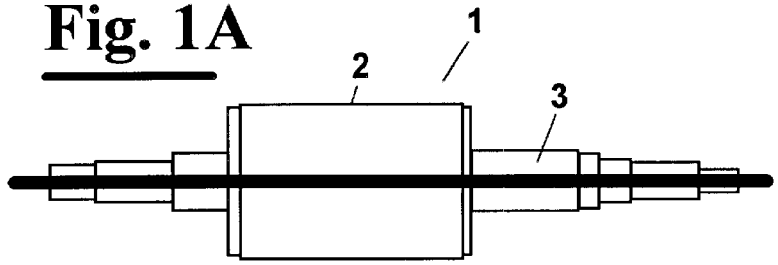
FIGS. 1A and 1B show a top plan view and a sectional view of an armature for electric motors in whose slots portions of insulating paper are inserted.
Figure 1B:
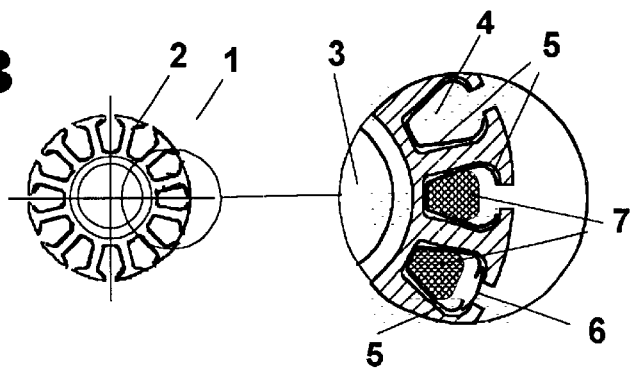

With reference to FIGS. 1A and 1B, an armature 1 for electric motors comprises a stack sheet 2 keyed on a shaft 3. In a transversal cross section the armature 1 has a plurality of slots 4 to be filled in a later phase with windings by means of coils of lead wire.

As known, the slots 4 have to be lined of insulating paper and precisely with a first insulating paper 5 folded substantially like a U and a second portion of insulating paper 6, or wedge, which closes together with the first portion 5 the winding 7, shown in the zoomed view of FIG. 1B in the three successive steps respectively after inserting the first portion of paper 5, after the winding 7 and after the wedge insertion 6.

Figure 2:
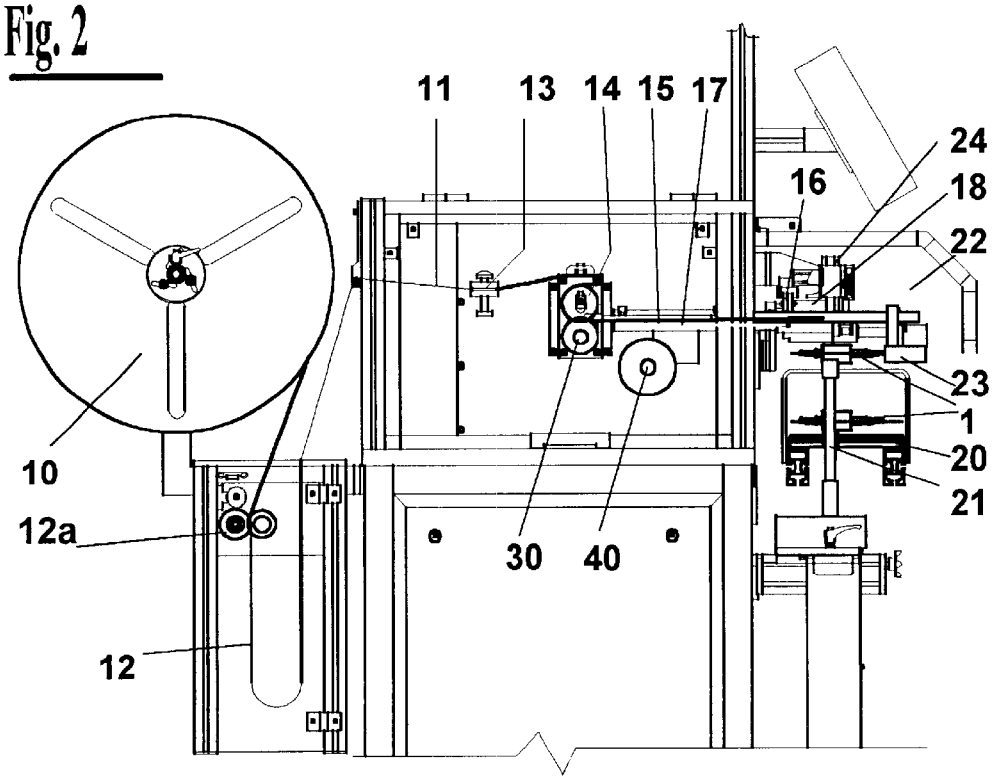
FIG. 2 shows a longitudinal elevational view of a insulating/wedge inserting machine according to the invention.
Figure 3:
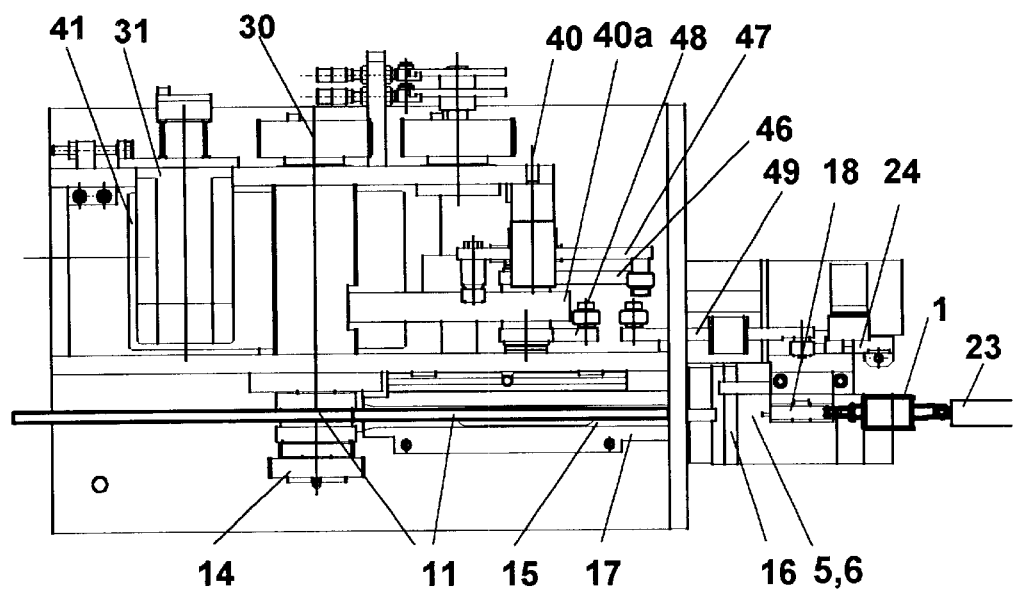
FIG. 3 shows a top plan view of the machine of FIG. 2.

An insulating machine for armatures 1 or wedge inserting machine, according to the invention, shown in FIGS. 2 and 3, comprises a coil 10 for unwinding a web 11 of insulating paper, forming a loop 12 fed by a couple of rollers 12a. A feeding unit is provided wherein the paper 11 corning from the loop 12 through a paper press 13 is pushed forward by means of a couple of rollers 14, which can be adjusted for carrying out also a longitudinal embossing.

For cutting into portions 5 or 6 the paper 11, which is pushed on a plane 15 downstream the feeding rollers 14, a transversal cutter is provided 16. The forward pushing of the cut portions 5 or 6 is carried out by means of an inserting tool 17 capable of reciprocating horizontally, described hereinafter, which inserts them in the armature 1.

Before that the inserting step starts, the armature 1 reaches automatically the machine by means of a conveyor 20 from which, according to the prior art, it is raised from below by a lift 21 and presented in the working zone 22 of the machine, where a pusher 23 arranges it for the inserting steps. Notwithstanding in all the known insulating/wedge inserting machines the armature is raised from below by the lift 21, it is not excluded that it is raised from the conveyor 20 from the above, by means of systems for picking it up obvious for a man of the art.

Then, once in position an index 24 gives the armature a first rotation for aligning the first slot with the axis of insertion, wherein inserting tool 17 lays.

In the case of a insulating machine, the paper is then folded like a U by bending instrument 18 that has reciprocating vertical movement and pushes the paper 5 in a U seat aligned with a slot 4 of the armature 1. Then, the paper 5 cut and bent is pushed forward by the inserting tool 17 into the slots 4 of the armature.

In the case of the wedge inserting machine, the cut paper 6 (not shown) is directly pushed in the slot by the inserting tool 17 without the previous step of bending, which according to the prior art is slightly different from that necessary for inserting the insulating portion 5.

The movement of cutting, inserting, bending (only for the insulating machine) and indexing are described in more detail hereinafter.

Always with reference to FIGS. 2 and 3, the machine has a first axis 30 for feeding the web beyond the cutter 16 by means of rollers 14, and a second axis 40 for operating in turn the means for cutting, bending, inserting and indexing.

Figure 4:
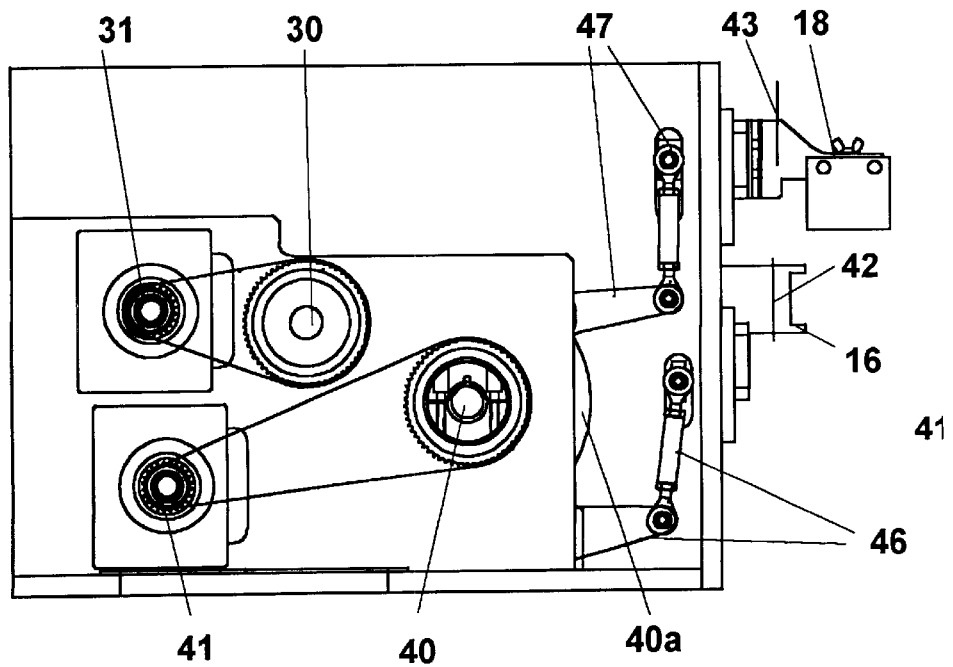
FIG. 4 shows a detail of the drive of the means for feeding paper and of the means for operating the cut and bending of the machine of FIGS. 2 and 3.

According to the invention, as shown in FIG. 4, an axis 30 is connected to a first motor 31 for feeding paper and an axis 40 is connected to a second motor 41 for operating the means for cutting, bending, inserting and indexing.

A control system described hereinafter operates the motor 31 for feeding and the motor 41 for operating according to a signal proportional to the achievement by the paper 11 of a predetermined position beyond the means for cutting 16 so that portions of the paper are cut in turn corresponding to this length.

Figure 5:
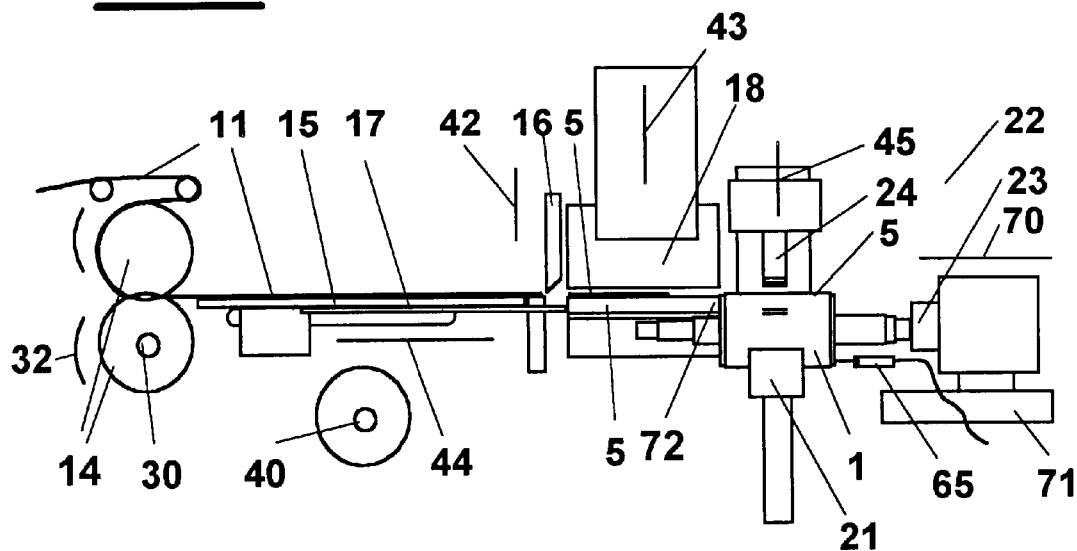
FIG. 5 shows a diagrammatical view of the movements of the machine of FIGS. 2, 3 and 4.

Therefore, with reference also to the diagrammatical view of FIG. 5 and to the arrows that indicate the movement:

the feeding 32 is operated by the motor 31;

in a mechanically independent way, the cutting 42 by means of the cutter 16, bending 43 (only for the insulating machine) by means of the utensil bending tool 18, inserting 44 by means of the inserting tool 17, indexing 45 by means of the device 24, are all operated by the motor 41.

Figure 6:
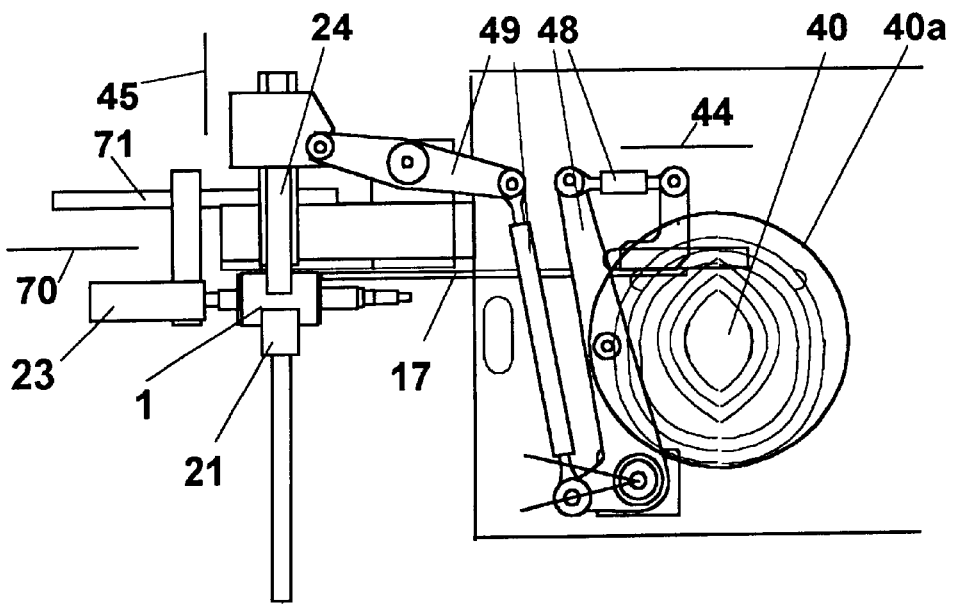
FIG. 6 and FIG. 7 show partial detailed views of a first embodiment of the means for operating the angular movement, or index, of the armatures.

More precisely, with reference to FIGS. 4 and 6, the rotation of the axis 40, by means of a cam 40a, causes:

the movement 42 of the cutter 16 by means of arms 46, the movement 43 of the support of the bending tool 18 by means of arms 47, the movement of insertion 44 of the inserting tool 18 by means of arms 48, the movement 45 of indexing 24 by means of arms 49.

Figure 7:
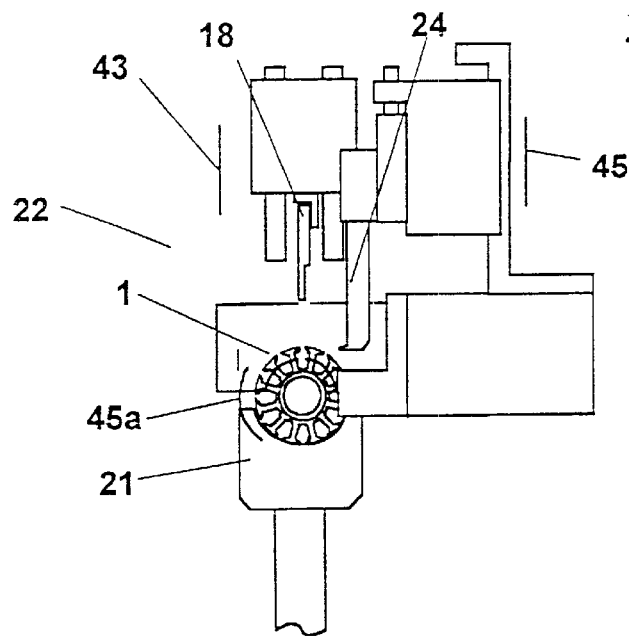

The movements of bending 43 and of indexing 45 are shown in detail in FIG. 7. In particular, the stepwise angular movement 45a is obtained by the reciprocation 45 of tool 24, in substantial overlap with the movement of bending 43, and is dependent mechanically from the cam 40a that operates the other movements above described.

Figure 8:
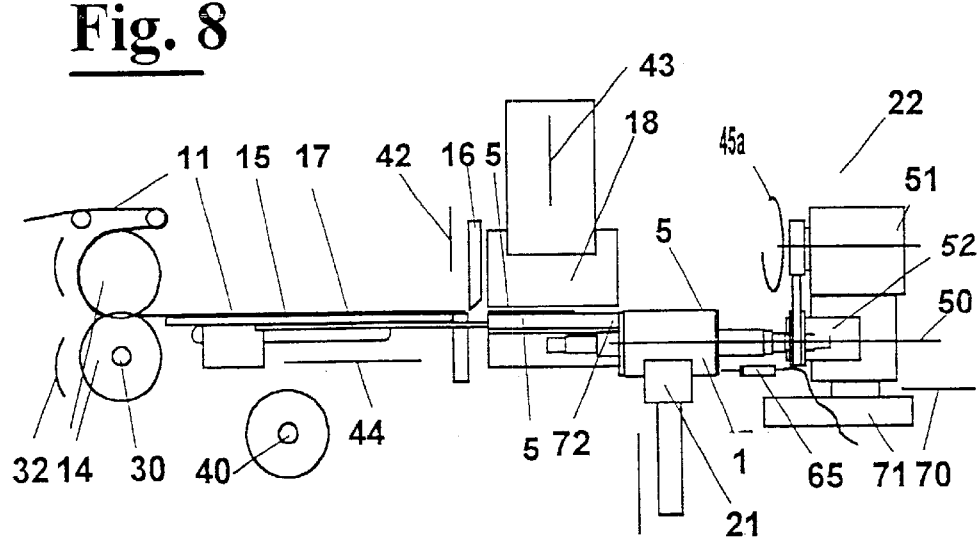
FIG. 8 shows a second embodiment of the means for operating the index.

According to a different embodiment of the invention, the angular positioning or index, instead of the mechanical drive derived from the movement of axis 40 and of cam 40a is obtained with greater flexibility as shown in FIG. 8 as preferred embodiment of the invention. Indexing 45a is carried out by a third axis 50, coincident with that of a pincer 52, operated independently by a motor 51.

Figure 9:
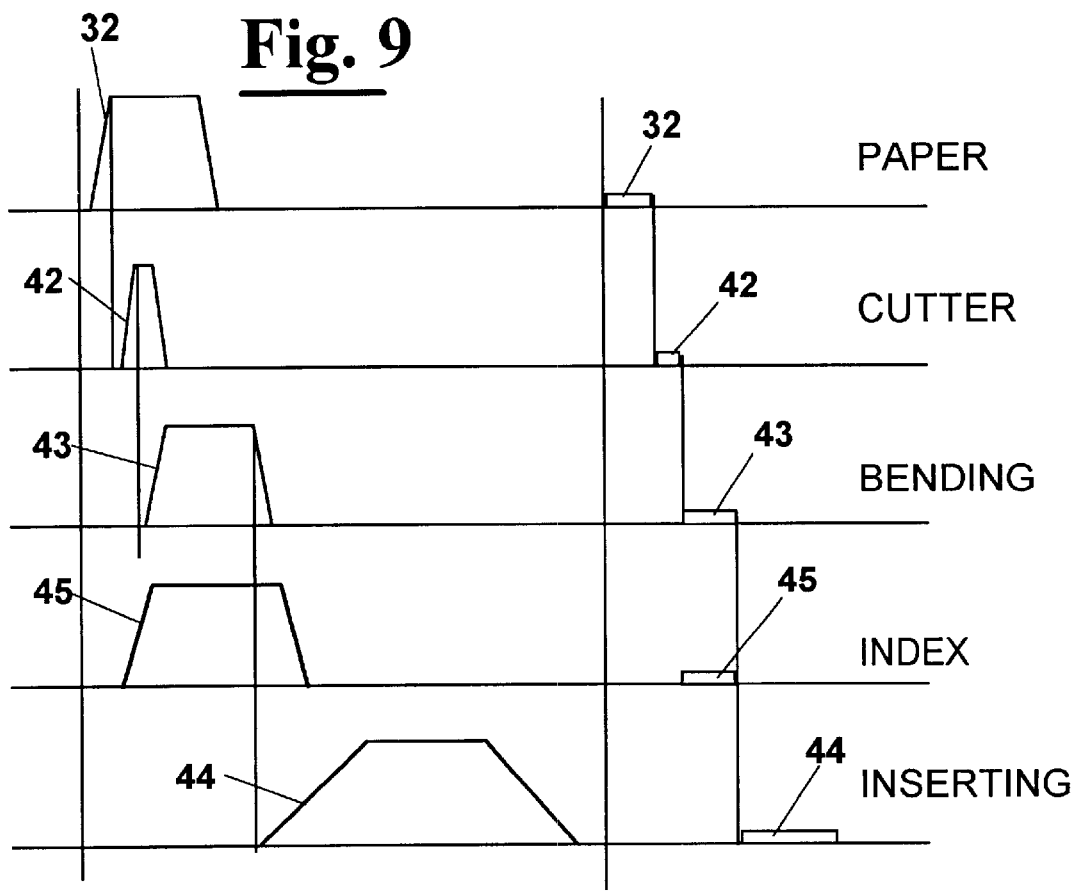
FIG. 9 shows a timing diagram of the succession of operations of the means for feeding, cutting, inserting, bending and indexing, showing both the movement of forward and back stroke of the mechanical devices of the machine and the timing of the active phases of the strokes.
Figure 10:
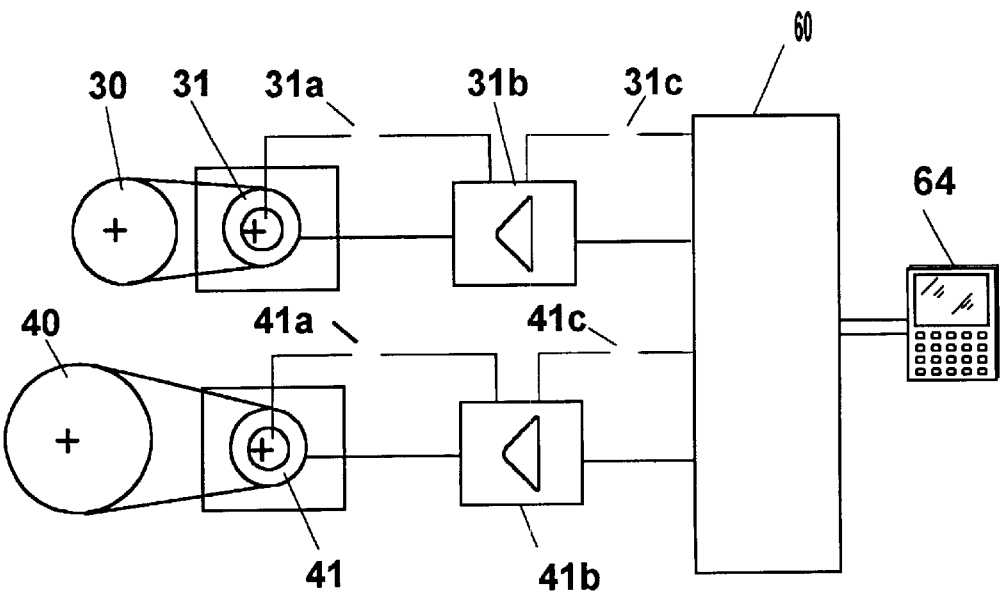
FIGS. 10 and 11 show a block diagram of a first and a second embodiment of the means for synchronisation of the first and second motor of FIG. 4.

As shown in FIG. 10, a PLC 60 provides means for synchronising the two motors 31 and 41, comprising a first resolver 31a on the first motor 31 and a second resolver 41a on the second motor 40. PLC 60 through drivers 31b and 41b, from which receives signals of feedback 31c and 41c, operates the motors 31 and 41 according to a predetermined function, responsive to signals of feedback coming from the first and second resolver 31a and 41a with respect to a diagrammatical view of priority shown in FIG. 9 and chosen through monitor 64. Furthermore setting at the monitor 64 the insertion timing, all the speed of the axes 31 and 41 are chosen in order to follow the priority of FIG. 9.

Figure 11:
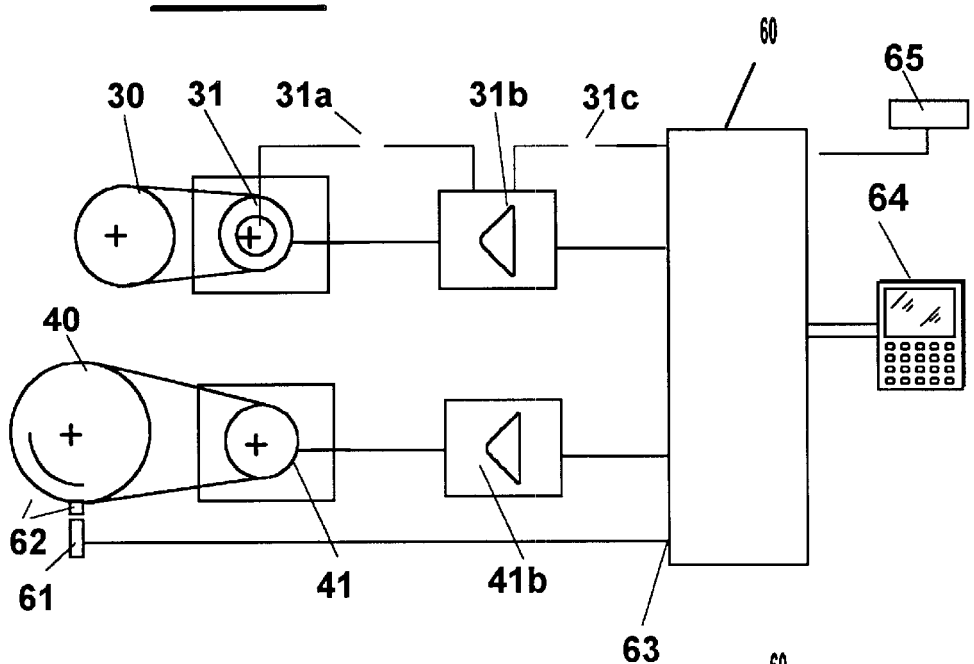

Alternatively to FIG. 10, the embodiment of FIG. 11 provides a sensor 61 that detects directly the passage of a point of reference 62 of the axis 40 in a precise angular position, according to which the paper is fed by means of motor 31 of axis 30. In particular, this solution allows to the signal to reach directly the PLC 60 through an input 63 of "interrupt", so that time of reaction of the PLC 60 is minimum and the best synchronisation is met.

Figure 12:
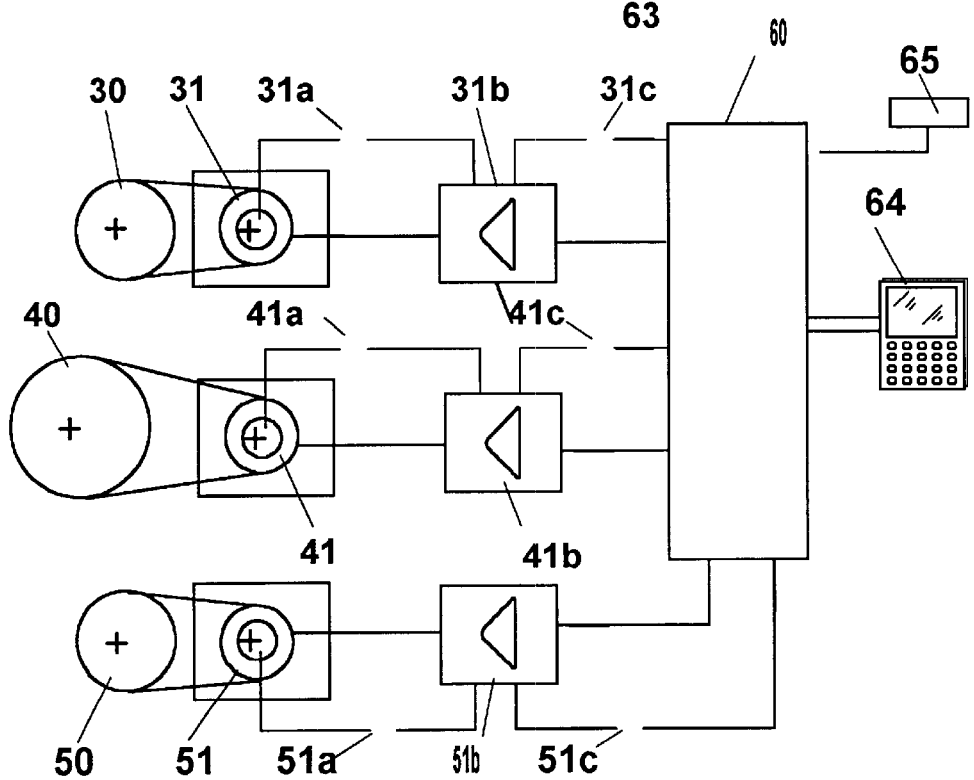
FIG. 12 shows a block diagram of the means for synchronisation of the first and second motor of FIG. 4 with the third motor of FIG. 8.

If the independent indexing is present by means of the motor 51, shown in FIG. 8, FIG. 10 is completed in FIG. 12, comprising the addition of a third resolver 51a on the third motor 50. PLC 60 through drivers 31b, 41b and 51b, from which receives signals of feedback 31c, 41 and 51c, operates motors 31, 41 and 51 according to a predetermined function, responsive to signals of feedback coming from the first, second and third resolver 31a, 41a and 51a with reference to the diagrammatical view of priority shown in FIG. 9 and chosen from monitor 64. Similarly, the embodiment of FIG. 11 can also be carried out for the diagrammatical view of FIG. 12.

In a preferred embodiment of the invention, shown in FIG. 5 and FIG. 8, sensors 65 are provided for the measurement of the dimensions of the armatures 1, such as in particular the stack height, in order to carry out a movement 32 of feeding the paper 11 responsive to this measurement and cutting in turn portions of paper 5 or 6 of corresponding length. Alternatively, such data can be determined at the entry of the armature 1 on the production line and transmitted directly to PLC 60 by means of a automatic system of identification of the armatures, for example by means of pallet conveyors provided with memory devices.

Always with reference to FIG. 8, the pincer 52 is equipped with, advantageously, a movement of approach 70 on a slide 71. This allows to work on armatures 1 of a desired height and diameter in a way completely automatic. In fact, carrying the armature 1 with its axis up to coincidence with that of pincer 52, it is sufficient then bring the armature 1 to a stop with a pawl 72 of reference. Then, by means of sensor 65, the actual stack height is determined with respect to the pawl 72 and is communicated automatically to PLC 60, which sets the length of the feeding paper by means of motor 31.

The advantages of such a timing are the following.

Firstly, the independence of the drive for feeding paper allows principally:

to move forward, with the feeding motor, a chosen amount of paper beyond the cutting line, operating the cutting motor in a chosen moment;

to adjust the position of the armature through the cutting motor by means of the index, in case the third motor is not provided;

to program the paper speed;

to load workpieces with a mixed flow, i.e. the possibility of working armatures of different size in a random way;

to insert insulating paper with exact length of the cut portion, for compensating possible stack height tolerance among armatures of equal nominal size;

to dispose of the scrap paper portion in the bending channel with a reverse stroke of the paper feeding motor;

to use different types of insulating paper for different types of armatures, without setting again the machine.

Furthermore it is possible program through the monitor the production rate of the whole insulating phase to adequate it to the production rate of the whole production line, allowing savings in case of slow production rate or to follow a higher production rate of the production line.

The foregoing description of a specific embodiment will so fully reveal the invention according to the conceptual point of view, so that others, by applying current knowledge, will be able to modify and/or adapt for various applications such embodiment without further research and without parting from the invention, and it is therefore to be understood that such adaptations and modifications will have to be considered to the equivalent to the specific embodiment. The means and the material to realise the different functions described herein could have a different nature without, for this reason, departing from the field of the invention. It is to be understood that the phraseology or terminology employed herein is for purpose of description and not of limitation.

What we claim is:

1. A device for inserting insulative materials into armature slots comprising:

means for feeding said insulative materials in a feeding direction;

means for cutting said insulative materials to form a cut insulative material;

means for bending said cut insulative materials to form a cut and bent insulative material;

means for inserting said cut and bent insulative material into a slot of said armature;

means for indexing said armature;

means for feeding said insulative material beyond said means for cutting;

means for operating in turn said means for cutting, bending, inserting and indexing;

at least one sensor means; and, a programmable logic circuit; wherein said sensor means communicates a signal to said programmable logic circuit; said signal being proportional to the positional relationship of said insulative material and said cutting means; said programmable logic circuit communicating with said operating means to independently control said means for feeding, cutting, bending, inserting and indexing means based on said signal.

2. The device of claim 1 wherein said programmable logic circuit comprises means for synchronizing said means for feeding with said means for operating.

3. The device of claim 2 wherein said means for synchronizing comprises:

first encoding means corresponding to said means for feeding;

second encoding means corresponding to said means for operating; and, a control unit responsive to signals communicated from said first and said second encoding means, said control unit controlling said means for feeding and said means for operating according to a predetermined function responsive to signals communicated from said first and said second encoding means.

4. The device of claim 1 further comprising:

a first motor for feeding said insulative material;

a second motor synchronously operating said means for cutting, bending, inserting, and indexing; and, distribution means, said distribution means timing in turn said feeding, cutting, bending, inserting and indexing.

5. The device according to claim 1 further comprising:

means for measuring the dimensions of said armatures, said means for measuring communicating with said programmable logic circuit, said programmable logic circuit controlling said means for feeding according to said dimensions such that said insulative material is cut in accordance with said dimensions.

6. The device of claim 1 comprising:

first means for feeding said insulative material;

second means for operating said cutting, bending and inserting in turn;

third means for operating said indexing;

angle sensor means for providing a second signal proportional to the achievement of said armature of a predetermined angular position with respect to said means for inserting; and, a second programmable logic circuit for controlling said means for indexing, said second programmable logic circuit responsive to said second signal to provide a predetermined angular movement of index.

7. The device according to claim 6 wherein said first means comprises a first motor, said second means comprises a second motor synchronously operating said means for cutting, bending and inserting, said third means comprises a third motor, and distribution means for timing in said feeding, cutting, bending, inserting and indexing.

8. The device according to claim 7 wherein said second programmable logic circuit comprises means for synchronizing said means for indexing with said means for operating, said second programmable logic unit controlling said means for indexing and said means for operating according to a predetermined function responsive to said signal communicated from said second encoding means and a third signal communicated from a third encoding means corresponding to the angular position of said means for indexing.

9. The device according to claim 1 further comprising a pincer, said pincer adapted for picking up said armature and moving said armature toward said means for inserting.

* * * * *